United States Patent
Tsai et al.

(10) Patent No.: US 7,353,045 B2
(45) Date of Patent: Apr. 1, 2008

(54) SWITCH CIRCUITRY AND ACCESS POINT

(75) Inventors: Ting-Yi Tsai, Taipei (TW); Wen Bing Luo, Taipei (TW); Taiho Wu, Taipei (TW); Jia-Haur Liang, Kaohsiung (TW); I-Ru Liu, Taipei (TW)

(73) Assignee: Accton Technology Corporation, Hsinchu (TW)

( * ) Notice: Subject to any disclaimer, the term of this patent is extended or adjusted under 35 U.S.C. 154(b) by 395 days.

(21) Appl. No.: 11/240,395

(22) Filed: Oct. 3, 2005

(65) Prior Publication Data

US 2007/0077895 A1   Apr. 5, 2007

(51) Int. Cl.
*H04M 1/00* (2006.01)
(52) U.S. Cl. .................... 455/562.1; 455/78
(58) Field of Classification Search ............. 455/78, 455/73, 562.1, 552.1, 553.1, 550.1, 561, 455/101; 370/328; 343/702
See application file for complete search history.

(56) References Cited

U.S. PATENT DOCUMENTS

2003/0215021 A1*  11/2003  Simmonds ............... 375/260
2005/0053164 A1*  3/2005  Catreux et al. ............ 375/260
2005/0074080 A1*  4/2005  Catreux et al. ............ 375/347
2005/0075081 A1*  4/2005  Catreux-Erceg et al ...... 455/78
2005/0105632 A1*  5/2005  Catreux-Erces et al. .... 375/267
2005/0141459 A1*  6/2005  Li et al. .................... 370/334
2005/0141630 A1*  6/2005  Catreux et al. ............ 375/267
2005/0143014 A1*  6/2005  Li et al. ..................... 455/69
2006/0029146 A1*  2/2006  Catreux et al. ............ 375/267

* cited by examiner

*Primary Examiner*—Lewis West
(74) *Attorney, Agent, or Firm*—Birch, Stewart, Kolasch & Birch, LLP

(57) ABSTRACT

A switch circuitry corresponds with a plurality of antennae. The switch circuitry includes a first switch module, a second switch module, and a third switch module. In this case, the first switch module, the second switch module, and the third switch module have a plurality of control leads, a plurality of signal leads, and a plurality of antenna leads respectively. The third switch module further has a plurality of transmission leads. Each signal lead connects with corresponding one of the antenna leads. In addition, an access point including the switch circuitry is provided.

26 Claims, 6 Drawing Sheets

| Control signal (S01) | Control signal (S02) | Control signal (S03) | Control signal (S04) | First signal lead (R01) | Second signal lead (R02) |
|---|---|---|---|---|---|
| 0 | 0 | 0 | 1 | First antenna lead (A01) | Third antenna lead (A03) |
| 0 | 0 | 1 | 0 | Third antenna lead (A03) | First antenna lead (A01) |
| 0 | 1 | 0 | 1 | First antenna lead (A01) | Fourth antenna lead (A04) |
| 0 | 1 | 1 | 0 | Fourth antenna lead (A04) | First antenna lead (A01) |
| 1 | 0 | 0 | 1 | Second antenna lead (A02) | Third antenna lead (A03) |
| 1 | 0 | 1 | 0 | Third antenna lead (A03) | Second antenna lead (A02) |
| 1 | 1 | 0 | 1 | Second antenna lead (A02) | Fourth antenna lead (A04) |
| 1 | 1 | 1 | 0 | Fourth antenna lead (A04) | Second antenna lead (A02) |

FIG. 3A

| Control signal (S05) | Control signal (S06) | Third signal lead (R03) | Fourth signal lead (R04) |
|---|---|---|---|
| 0 | 1 | Fifth antenna lead (A05) | Sixth antenna lead (A06) |
| 1 | 0 | Sixth antenna lead (A06) | Fifth antenna lead (A05) |

FIG. 3B

| Control signal (S07) | Control signal (S08) | Control signal (S09) | Control signal (S10) | Fifth signal lead (R05) | Sixth signal lead (R06) |
|---|---|---|---|---|---|
| 0 | 0 | 0 | 1 | Seventh antenna lead (A07) | Ninth antenna lead (A09) |
| 0 | 0 | 1 | 0 | Ninth antenna lead (A09) | Seventh antenna lead (A07) |
| 0 | 1 | 0 | 1 | Seventh antenna lead (A07) | Tenth antenna lead (A10) |
| 0 | 1 | 1 | 0 | Tenth antenna lead (A10) | Seventh antenna lead (A07) |
| 1 | 0 | 0 | 1 | Eighth antenna lead (A08) | Ninth antenna lead (A09) |
| 1 | 0 | 1 | 0 | Ninth antenna lead (A09) | Eighth antenna lead (A08) |
| 1 | 1 | 0 | 1 | Eighth antenna lead (A08) | Tenth antenna lead (A10) |
| 1 | 1 | 1 | 0 | Tenth antenna lead (A10) | Eighth antenna lead (A08) |

FIG. 3C

SWITCH CIRCUITRY AND ACCESS POINT

BACKGROUND OF THE INVENTION

1. Field of Invention

The invention relates to a switch circuitry and a communication device and, in particular, to a switch circuitry and an access point.

2. Related Art

Recently, the requirement for mobile data is increased, and the network market is well developed. To efficiently link with the network, the wireless LAN (local area network) with the advantages of the reduced need for cables, fast installation and good mobility has been invented. Regarding to the wireless LAN, the dual-band wireless LAN possesses the potential for the trend in the future.

To connect to Internet with the wireless LAN, some equipments, such as the high-throughput access point, are necessary. However, the conventional access point has the problem of in-band interference if it concurrently uses dual channels in a band to enhance the link quality. To solve this problem, those skilled persons have developed some technologies such as dual-band radios to avoid the in-band interference between radios, and the isolated antennae with wide antenna spacing to mitigate the in-band interference between radios. Accordingly, the present wireless access points usually have switch circuitry for connecting various radios with antennae of various configurations. In this case, the manufactures has another troublesome issue of developing switch circuitries of different designs for the wireless access points of different designs. As a result, the manufacturing efficiency for the access points decreases.

It is therefore an important subject of the invention to provide a switch circuitry including radio and antenna configuration selections in addition to conventional antenna diversity and Transmit/Receive selections, which can be applied in the access points of different designs, so as to increase the manufacturing efficiency of the products.

SUMMARY OF THE INVENTION

In view of the foregoing, the invention is to provide a switch circuitry, which can be applied in the access points of different designs.

To achieve the above, a switch circuitry of the invention, which corresponds with a plurality of antennae, comprises a first switch module, a second switch module and a third switch module. In the invention, the first switch module comprises a first control lead, a second control lead, a third control lead, a fourth control lead, a first signal lead, a second signal lead, a first antenna lead, a second antenna lead, a third antenna lead, a fourth antenna lead, a first transmission lead, a second transmission lead, a third transmission lead and a fourth transmission lead. The first switch module couples the first signal lead and the second signal lead to two of the first, second, third and fourth antenna leads according to a plurality of control signals inputted from the first, second, third and fourth control leads. The second switch module comprises a fifth control lead, a sixth control lead, a third-signal lead, a fourth signal lead, a fifth antenna lead and a sixth antenna lead. The second switch module couples the third signal lead and the fourth signal lead to the fifth antenna lead and the sixth antenna lead according to a plurality of control signals inputted from the fifth control lead and the sixth control lead. The third switch module comprises a seventh control lead, an eighth control lead, a ninth control lead, a tenth control lead, a fifth signal lead, a sixth signal lead, a seventh antenna lead, an eighth antenna lead, a ninth antenna lead and a tenth antenna lead. The third switch module couples the fifth signal lead and the sixth signal lead to two of the seventh, eighth, ninth and tenth antenna leads according to a plurality of control signals inputted from the seventh eighth, ninth and tenth control leads. The first, second, third, fourth, fifth, sixth, seventh, eighth, ninth and tenth antenna leads are signally connected to the antennae, respectively.

In addition, the invention also discloses an access point, which comprises a control module, an RF module, a switch circuitry and a plurality of antennae. In the invention, the control module outputs a plurality of control signals. The RF module connects to the control module and outputs a plurality of RF signals and a plurality control signals. The switch circuitry comprises a first switch module, a second switch module and a third switch module. The first switch module comprises a first control lead, a second control lead, a third control lead, a fourth control lead, a first signal lead, a second signal lead, a first antenna lead, a second antenna lead, a third antenna lead, a fourth antenna lead, a first transmission lead, a second transmission lead, a third transmission lead and a fourth transmission lead. The second switch module comprises a fifth control lead, a sixth control lead, a third signal lead, a fourth signal lead, a fifth antenna lead and a sixth antenna lead. The third switch module comprises a seventh control lead, an eighth control lead, a ninth control lead, a tenth control lead, a fifth signal lead, a sixth signal lead, a seventh antenna lead, an eighth antenna lead, a ninth antenna lead and a tenth antenna lead. The antennae are respectively signally connected to the first, second, third, fourth, fifth, sixth, seventh, eighth, ninth and tenth antenna leads. The control signals are respectively inputted through the first, second, third, fourth, fifth, sixth, seventh, eighth, ninth and tenth control leads. The RF module connects to the first, second, third, fourth, fifth and sixth signal leads and the third, fourth, fifth, sixth, seventh and eighth control leads. The first switch module couples the first signal lead and the second signal lead to two of the first, second, third and fourth antenna leads according to the control signals inputted from the first, second, third and fourth control leads. The second switch module couples the third signal lead and the fourth signal lead to the fifth antenna lead and the sixth antenna lead according to the control signals inputted from the fifth control lead and the sixth control lead. The third switch module couples the fifth signal lead and the sixth signal lead to two of the seventh, eighth, ninth and tenth antenna leads according to the control signals inputted from the seventh, eighth, ninth and tenth control leads.

As mentioned above, the switch circuitry of the invention is designed with the first transmission lead, the second transmission lead, the third transmission lead and the fourth transmission lead. Therefore, several wireless access points of different designs including radio and antenna configuration selections in addition to conventional antenna diversity and Transmit/Receive selections can be carried out according to variant connecting ways of the transmission leads. Accordingly, the manufacturing efficiency of the products (access points) can be enhanced.

BRIEF DESCRIPTION OF THE DRAWINGS

The invention will become more fully understood from the detailed description given herein below illustration only, and thus is not limitative of the present invention, and wherein:

FIGS. 3A to 3C are schematic diagrams showing the control logics of the first switch module, the second switch module and the third switch module;

DETAILED DESCRIPTION OF THE INVENTION

The present invention will be apparent from the following detailed description, which proceeds with reference to the accompanying drawings, wherein the same references relate to the same elements.

Figure 1:
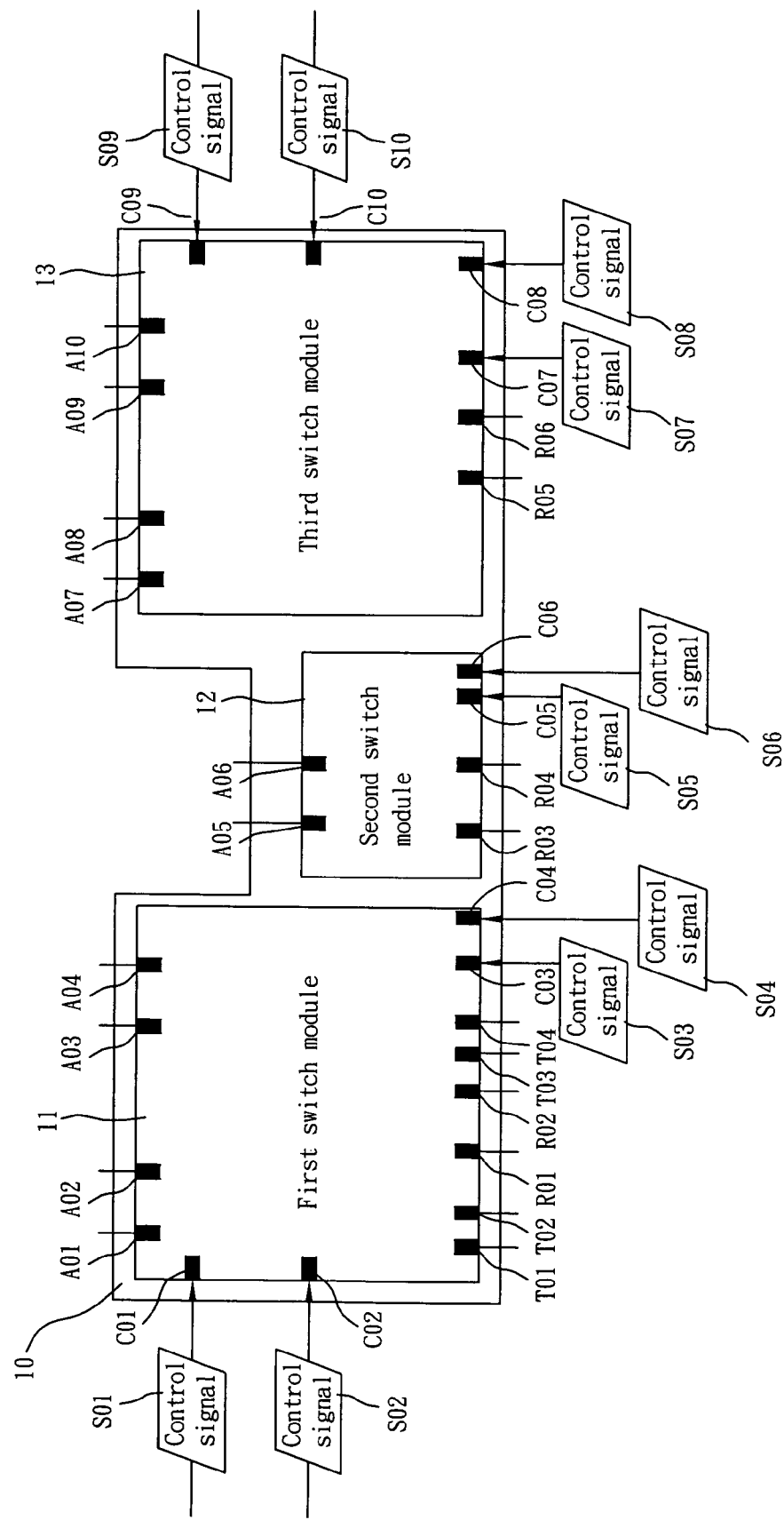
FIG. 1 is a schematic view of a switch circuitry according to a preferred embodiment of the invention.

With reference to FIG. 1, a switch circuitry 10 according to a preferred embodiment of the invention, which corresponds with a plurality of antennae, includes a first switch module 11, a second switch module 12 and a third switch module 13.

As shown in FIG. 1, the first switch module 11 includes a first control lead C01, a second control lead C02, a third control lead C03, a fourth control lead C04, a first signal lead R01, a second signal lead R02, a first antenna lead A01, a second antenna lead A02, a third antenna lead A03, a fourth antenna lead A04, a first transmission lead T01, a second transmission lead T02, a third transmission lead T03 and a fourth transmission lead T04. The first switch module 11 couples the first signal lead R01 and the second signal lead R02 to two of the first antenna lead A01, the second antenna lead A02, the third antenna lead A03 and the fourth antenna lead A04 according to a plurality of control signals S01 to S04 inputted from the first control lead C01, the second control lead C02, the third control lead C03 and the fourth control lead C04.

The second switch module 12 includes a fifth control lead C05, a sixth control lead C06, a third signal lead R03, a fourth signal lead R04, a fifth antenna lead A05 and a sixth antenna lead A06. The second switch module 12 couples the third signal lead R03 and the fourth signal lead R04 to the fifth antenna lead A05 and the sixth antenna lead A06 according to a plurality of control signals S05 to S06 inputted from the fifth control lead C05 and the sixth control lead C06.

The third switch module 13 includes a seventh control lead C07, an eighth control lead C08, a ninth control lead C09, a tenth control lead C10, a fifth signal lead R05, a sixth signal lead R06, a seventh antenna lead A07, an eighth antenna lead A08, a ninth antenna lead A09 and a tenth antenna lead A10. The third switch module 13 couples the fifth signal lead R05 and the sixth signal lead R06 to two of the seventh antenna lead A07, the eighth antenna lead A08, the ninth antenna lead A09 and the tenth antenna lead A10 according to a plurality of control signals S07 to S10 inputted from the seventh control lead C07, the eighth control lead C08, the ninth control lead C09 and the tenth control lead C10.

In the present embodiment, the first antenna lead A01, the second antenna lead A02, the third antenna lead A03, the fourth antenna lead A04, the fifth antenna lead A05, the sixth antenna lead A06, the seventh antenna lead A07, the eighth antenna lead A08, the ninth antenna lead A09 and the tenth antenna lead A10 are signally connected to the antennae.

In addition, the first transmission lead T01, the second transmission lead T02, the third transmission lead T03 and the fourth transmission lead T04 can be coupled with jumpers or filters such as duplex filters.

In the switch circuitry 10, when the first signal lead R01 is coupled to one of the first antenna lead A01 and the second antenna lead A02, the second signal lead R02 is coupled to one of the third antenna lead A03 and the fourth antenna lead A04. In contrary, when the first signal lead R01 is coupled to one of the third antenna lead A03 and the fourth antenna lead A04, the second signal lead R02 is coupled to one of the first antenna lead A01 and the second antenna lead A02.

When the third signal lead R03 is coupled to one of the fifth antenna lead A05 and the sixth antenna lead A06, the fourth signal lead R04 is coupled to the other one of the fifth antenna lead A05 and the sixth antenna lead A06.

Moreover, when the fifth signal lead R05 is coupled to one of the seventh antenna lead A07 and the eighth antenna lead A08, the sixth signal lead R06 is coupled to one of the ninth antenna lead A09 and the tenth antenna lead A10. In contrary, when the fifth signal lead R05 is coupled to one of the ninth antenna lead A09 and the tenth antenna lead A10, the sixth signal lead R06 is coupled to one of the seventh antenna lead A07 and the eighth antenna lead A08.

Figure 2:
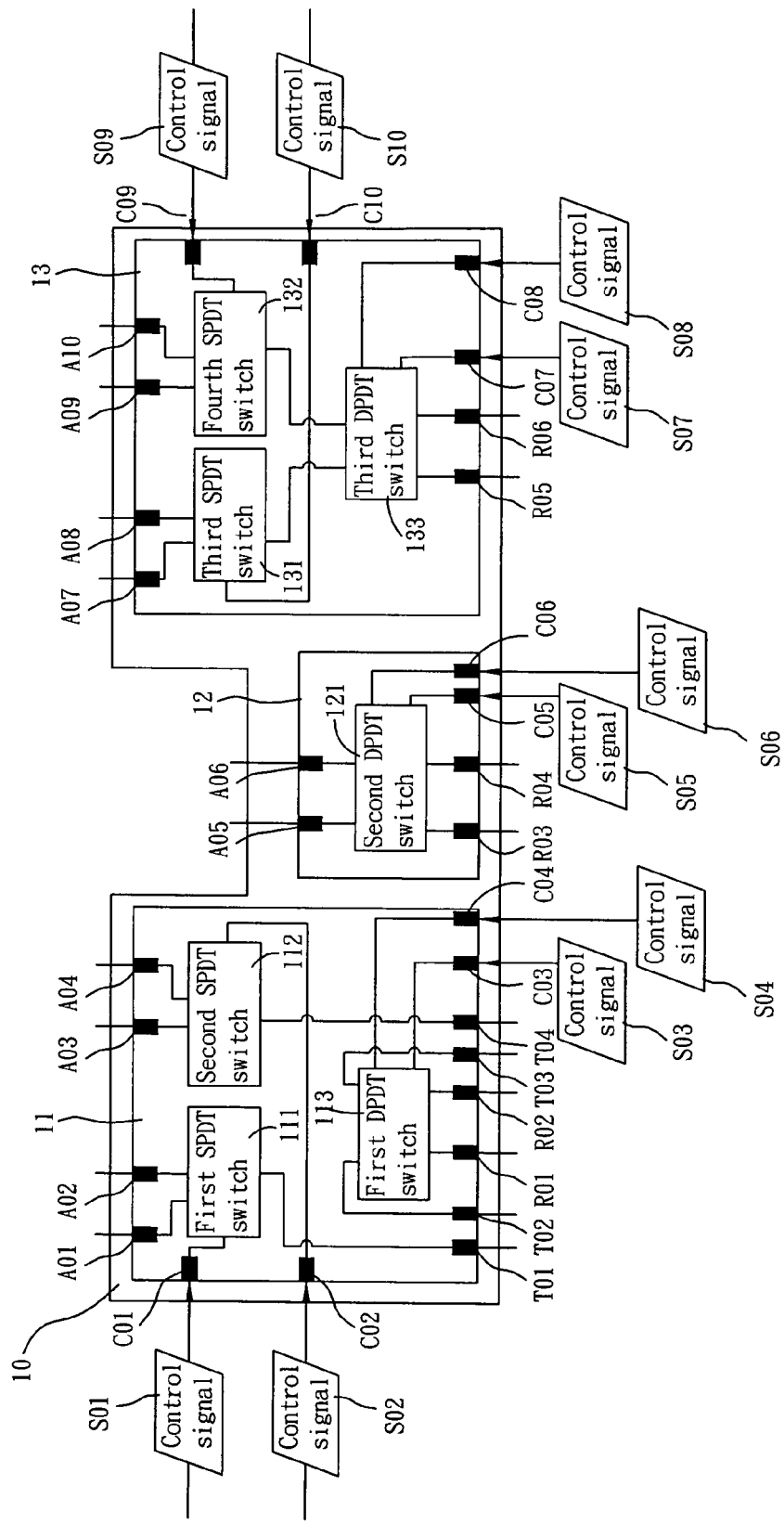
FIG. 2 is a schematic view showing the detailed structure of the switch circuitry shown in FIG. 1.

With reference to FIG. 2, the first switch module 11 is composed of a first SPDT (single pole double throw) switch 111, a second SPDT switch 112 and a first DPDT (double pole double throw) switch 113. In the current embodiment, the first SPDT switch 111 includes the first control lead C01, the first transmission lead T01, the first antenna lead A01 and the second antenna lead A02. The second SPDT switch 112 includes the second control lead C02, the fourth transmission lead T04, the third antenna lead A03 and the fourth antenna lead A04. The first DPDT switch 113 includes the third control lead C03, the fourth control lead C04, the first signal lead R01, the second signal lead R02, the second transmission lead T02 and the third transmission lead T03. Referring to FIG. 3A, which shows the control logics of the first switch module 11, the connections between the signal leads and the antenna leads can be controlled with the control signals of the control leads. For example, when the control signals S01 to S04 of the first to fourth control leads are "0, 0, 0, 1", the first signal lead R01 is coupled to the first antenna lead A01 and the second signal lead R02 is coupled to the third antenna lead A03. In another aspect, when the control signals S01 to S04 of the first to fourth control leads are "1, 0, 1, 0", the first signal lead R01 is coupled to the third antenna lead A03 and the second signal lead R02 is coupled to the second antenna lead A02. In the embodiment, the first switch module 11 can provide eight arrangements between the signal leads and the antenna leads.

To be noted, the architectures of the SPDT switch and DPDT switch are familiar to persons of ordinary skill in the art. In detailed, the SPDT switch has a first I/O port (A port) and two second I/O ports (B port and C port), and provides two connection modes. In the first connection mode, one connection is established between the first I/O port (A port) and one second I/O port (B port). In the second connection mode, another connection is established between the first I/O port (A port) and the other second I/O port (C port). In addition, the DPDT switch has two first I/O ports (A port and B port) and two second I/O ports (C port and D port), and provides two connection modes. In the first connection mode, two connections, including one connection between one first I/O port (A port) and one second I/O port (C port)

and the other connection between the other first I/O port (B port) and the other second I/O port (D port), are established. In the second connection mode, another two connections, including one connection between one first I/O port (A port) and the other second I/O port (D port) and the other connection between the other first I/O port (B port) and one second I/O port (C port), are established.

The second switch module 12 is composed of a second DPDT switch 121. In the present embodiment, the second DPDT switch 121 includes the fifth control lead C05, the sixth control lead C06, the third signal lead R03, the fourth signal lead R04, the fifth antenna lead A05 and the sixth antenna lead A06. Referring to FIG. 3B, which shows the control logics of the second switch module 12, the connections between the signal leads and the antenna leads can be controlled with the control signals of the control leads. For example, when the control signals S05 to S06 of the fifth and sixth control leads are "0, 1", the third signal lead R03 is coupled to the fifth antenna lead A05 and the fourth signal lead R04 is coupled to the sixth antenna lead A06. In another aspect, when the control signals S05 to S06 of the fifth and sixth control leads are "1, 0", the third signal lead R03 is coupled to the sixth antenna lead A06 and the fourth signal lead R04 is coupled to the fifth antenna lead A05. In the embodiment, the second switch module 12 can provide two arrangements between the signal leads and the antenna leads.

The third switch module 13 is composed of a third SPDT switch 131, a fourth SPDT switch 132 and a third DPDT switch 133. In this embodiment, the third SPDT switch 131 includes the ninth control lead C09, the seventh antenna lead A07 and the eighth antenna lead A08. The fourth SPDT switch 132 includes the tenth control lead C10, the ninth antenna lead A09 and the tenth antenna lead A10. The third DPDT switch 133 includes the seven control lead C07, the eighth control lead C08, the fifth signal lead R05 and the sixth signal lead R06. The third SPDT switch 131 and the fourth SPDT switch 132 are signally connected to the third DPDT switch 133. Referring to FIG. 3C, which shows the control logics of the third switch module 13, the connections between the signal leads and the antenna leads can be controlled with the control signals of the control leads. For example, when the control signals S07 to S10 of the seventh to tenth control leads are "0, 0, 1, 0", the fifth signal lead R05 is coupled to the ninth antenna lead A09 and the sixth signal lead R06 is coupled to the seventh antenna lead A07. In another aspect, when the control signals S07 to S10 of the seventh to tenth control leads are "1, 1, 0, 1", the fifth signal lead R05 is coupled to the eight antenna lead A08 and the sixth signal lead R06 is coupled to the tenth antenna lead A10. In the embodiment, the third switch module 13 can provide eight arrangements between the signal leads and the antenna leads.

In this embodiment, the first transmission lead T01, the second transmission lead T02, the third transmission lead T03 and the fourth transmission lead T04 can be connected with jumpers or duplex filters, so that the switch circuitry 10 can provide various kinds of structures. Accordingly, the access points of different designs can be obtained. To be noted, the jumper is used to connect two of the transmission leads so as to establish the connection between the first DPDT switch 113 and the first SPDT switch 111 or the second SPDT switch 112. In addition, the filter can filter the RF signal. For example, the duplex filter can filter the RF signal to output a high frequency RF signal (4.9~5.9 GHz) and a low frequency RF signal (2.4~2.5 GHz).

To make the invention more comprehensive, several embodiments will be described hereinafter for illustrating how to use the various structures of the switch circuitry 10 to develop the access points of different designs.

Figure 4:
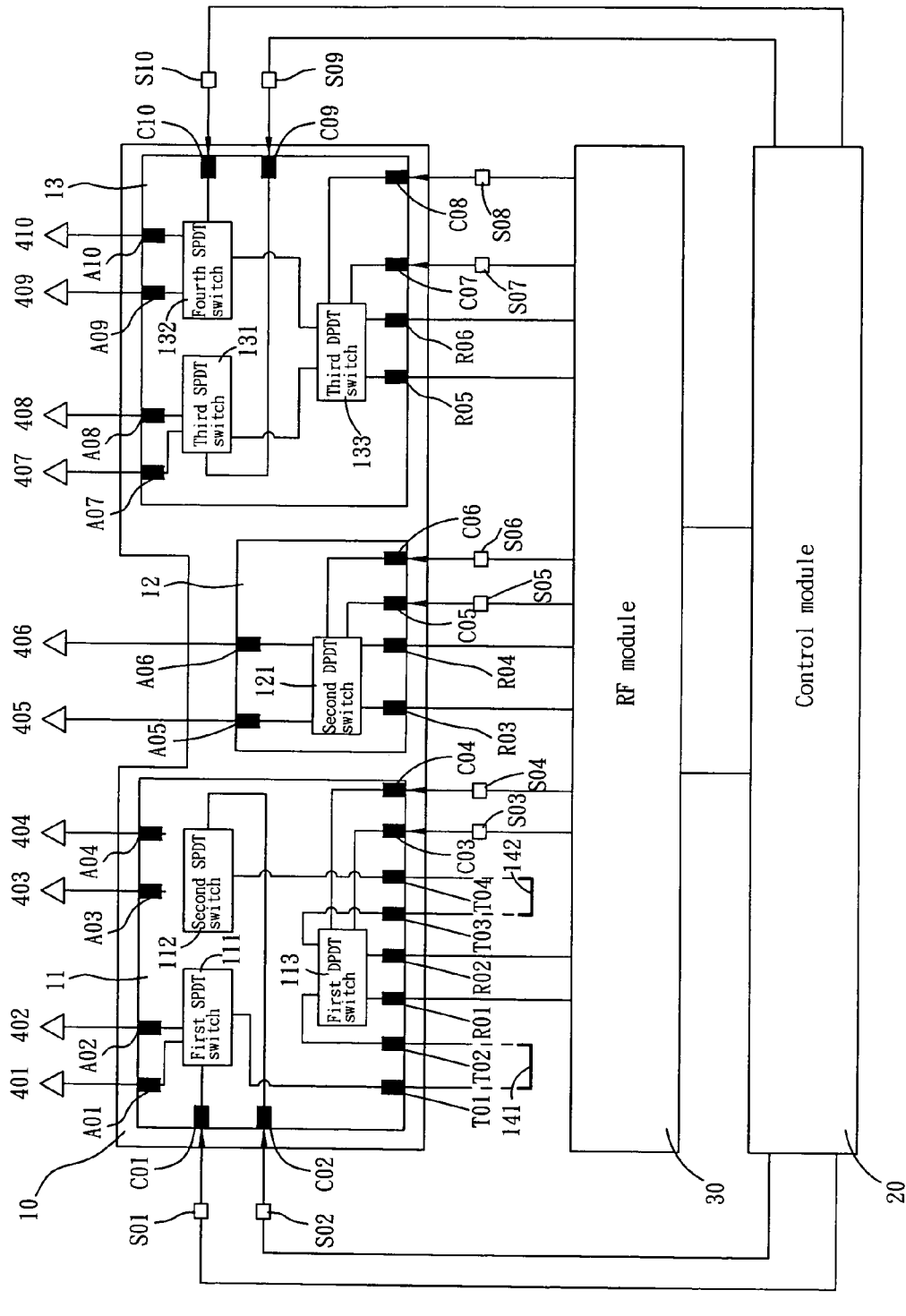
FIG. 4 is a schematic view of an access point according to a preferred embodiment of the invention.

With reference to FIG. 4, an access point 3 according to a preferred embodiment of the invention comprises a control module 20, an RF module 30, a switch circuitry 10 and a plurality of antennae 401-410. In this embodiment, the switch circuitry 10 comprises a first switch module 11, a second switch module 12 and a third switch module 13. The main structure of the switch circuitry 10 is the same as that described in the previous embodiment, so the detailed descriptions are omitted for concise purpose.

As shown in FIG. 4, the control module 20 of this embodiment outputs a plurality of control signals S01-S02 and S09-S10, which are respectively outputted to the first control lead C01, the second control lead C02, the ninth control lead C09 and the tenth control lead C10.

The RF module 30 outputs a plurality of RF signals to the first signal lead R01, the second signal lead R02, the third signal lead R03, the fourth signal lead R04, the fifth signal lead R05 and the sixth signal lead R06, and outputs a plurality control signals S03-S08 to the third control lead C03, the fourth control lead C04, the fifth control lead C05, the sixth control lead C06, the seventh control lead C07 and the eighth control lead C08. As shown in FIG. 4, the RF module 30 is connected to the control module 20.

The antennae 401-410 comprise a plurality of 802.11a antennae and a plurality of 802.11g antennae. In the current embodiment, the antennae 401-404 are 802.11a antennae, and the antennae 405-410 are 802.11g antennae.

In this embodiment, the antennae 401-404 signally connect to the first antenna lead A01, the second antenna lead A02, the third antenna lead A03 and the fourth antenna lead A04, respectively. The antennae 405-410 signally connect to the fifth antenna lead A05, the sixth antenna lead A06, the seventh antenna lead A07, the eighth antenna lead A08, the ninth antenna lead A09 and the tenth antenna lead A10, respectively.

In addition, the switch circuitry 10 of the embodiment further comprises a first jumper 141 and a second jumper 142. The first jumper 141 signally connects the first transmission lead T01 and the second transmission lead T02. The second jumper 142 signally connects the third transmission lead T03 and the fourth transmission lead T04.

In the present embodiment, the first transmission lead T01 and the second transmission lead T02 are connected with the first jumper 141, and the third transmission lead T03 and the fourth transmission lead T04 are connected with the second jumper 142. Thus, the RF module 30 can signally connect to the antennae 401-410 through the switch circuitry 10. As a result, the access point 3 can radiate and receive 802.11a signals and 802.11g signals via the 802.11a antennae 401-404 and the 802.11g antennae 405-410. In this embodiment, a first kind of access point with the antenna selection function including the switch circuitry 10 is present.

Figure 5:
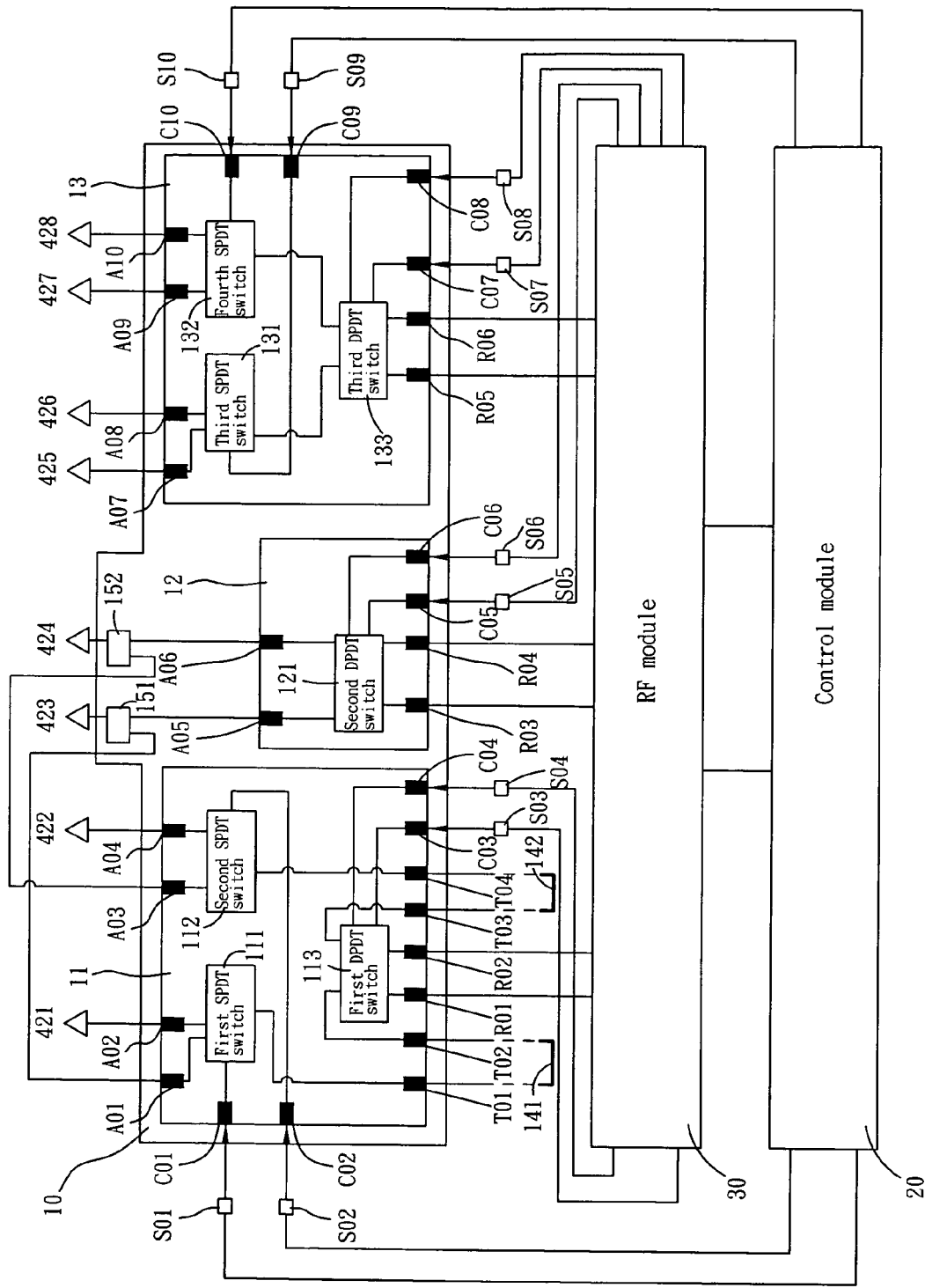
FIG. 5 is a schematic view of an access point according to another preferred embodiment of the invention.

With reference to FIG. 5, an access point 4 according to another embodiment of the invention comprises a control module 20, an RF module 30, a switch circuitry 10 and a plurality of antennae 421-428. In this embodiment, the switch circuitry 10 comprises a first switch module 11, a second switch module 12, a third switch module 13, a first jumper 141 and a second jumper 142. The main structure of the switch circuitry 10 and the structures of the control module 20 and the RF module 30 are the same as those described in the previous embodiment, so the detailed descriptions are omitted for concise purpose.

As shown in FIG. 5, the antennae 421-428 comprise a plurality of 802.11a antennae, a plurality of 802.11g antennae and a plurality of 802.11a/g antennae. In the current embodiment, the antennae 421-422 are 802.11a antennae, the antennae 423-424 are 802.11a/g antennae and the antennae 425-428 are 802.11g antennae.

In this embodiment, the antennae 421-422 signally connect to the second antenna lead A02 and the fourth antenna lead A04, respectively. The antennae 425-428 signally connect to the seventh antenna lead A07, the eighth antenna lead A08, the ninth antenna lead A09 and the tenth antenna lead A10, respectively.

In addition, the switch circuitry 10 of the embodiment further comprises a first duplex filter 151 and a second duplex filter 152. The first antenna lead A01 and the fifth antenna lead A05 signally connect to the antenna 423 through the first duplex filter 151. The third antenna lead A03 and the sixth antenna lead A06 signally connect to the antenna 424 through the second duplex filter 152. In this embodiment, the first duplex filter 151 can filter the radio signals received by the antenna 423 to output a high frequency RF signal (4.9~5.9 GHz or 802.11a) to the first antenna lead A01 and a low frequency RF signal (2.4~2.5 GHz or 802.11g) to the fifth antenna lead A05. In addition, the second duplex filter 152 can filter the radio signals received by the antenna 424 to output a high frequency RF signal (4.9~5.9 GHz or 802.11a) to the third antenna lead A03 and a low frequency RF signal (2.4~2.5 GHz or 802.11g) to the sixth antenna lead A06.

In the current embodiment, the first transmission lead T01 and the second transmission lead T02 are connected with the first jumper 141, and the third transmission lead T03 and the fourth transmission lead T04 are connected with the second jumper 142. Thus, the RF module 30 can signally connect to the antennae 421-428 through the switch circuitry 10. As a result, the access point 4 can radiate and receive 802.11a signals and 802.11g signals via the 802.11a antennae 421-422, the 802.11a/g antennae 423-424 and the 802.11g antennae 425-428. In this embodiment, a second kind of access point with the antenna selection function including the switch circuitry 10 is present.

Figure 6:
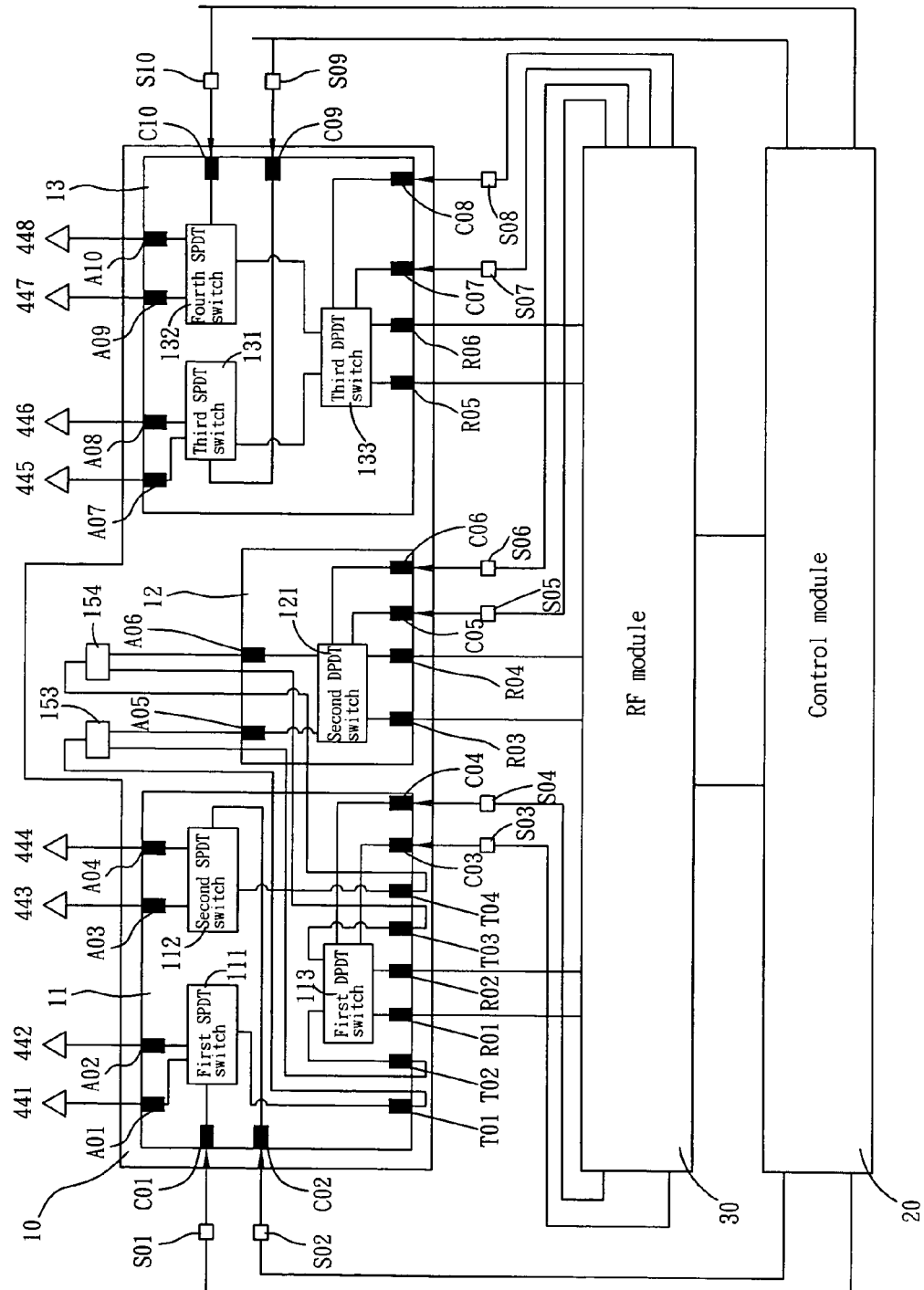
FIG. 6 is a schematic view of an access point according to still another preferred embodiment of the invention.

Moreover, with reference to FIG. 6, an access point 5 according to still another embodiment of the invention comprises a control module 20, an RF module 30, a switch circuitry 10 and a plurality of antennae 441-448. In this embodiment, the switch circuitry 10 comprises a first switch module 11, a second switch module 12 and a third switch module 13. The main structure of the switch circuitry 10 and the structures of the control module 20 and the RF module 30 are the same as those described in the previous embodiment, so the detailed descriptions are omitted for concise purpose.

As shown in FIG. 6, the antennae 441-448 comprise a plurality of 802.11a/g antennae and a plurality of 802.11g antennae. In the current embodiment, the antennae 441-444 are 802.11a/g antennae, and the antennae 445-448 are 802.11g antennae.

In this embodiment, the antennae 441-444 signally connect to the first antenna lead A01, the second antenna lead A02, the third antenna lead A03 and the fourth antenna lead A04, respectively. The antennae 445-448 signally connect to the seventh antenna lead A07, the eighth antenna lead A08, the ninth antenna lead A09 and the tenth antenna lead A10, respectively.

In addition, the switch circuitry 10 of the embodiment further comprises a third duplex filter 153 and a fourth duplex filter 154. The second transmission lead T02 and the fifth antenna lead A05 signally connect to the first transmission lead T01 through the third duplex filter 153. The third transmission lead T03 and the sixth antenna lead A06 signally connect to the fourth transmission lead T04 through the fourth duplex filter 154. In this embodiment, the first duplex filter 151 can filter the radio signals received by the antenna 441 or 442 through the first SPDT switch 111 and the first transmission lead T01 to output a high frequency RF signal (4.9~5.9 GHz or 802.11a) to the first signal lead R01 or second signal lead R02 through the second transmission lead T02 and the first DPDT switch 113 and a low frequency RF signal (2.4~2.5 GHz or 802.11g) to the fifth antenna lead A05. In addition, the second duplex filter 152 can filter the radio signals received by the antenna 443 or 444 through the second SPDT switch 112 and the fourth transmission lead T04 to output a high frequency RF signal (4.9~5.9 GHz or 802.11a) to the second signal lead R02 or first signal lead R01 through the third transmission lead T03 and the first DPDT switch 113 and a low frequency RF signal (2.4~2.5 GHz or 802.11g) to the sixth antenna lead A06.

In this embodiment, the second transmission lead T02 and the fifth antenna lead A05 are connected to the first transmission lead T01 through the third duplex filter 153, and the third transmission lead T03 and the sixth antenna lead A06 are connected to the fourth transmission lead T04 through the fourth duplex filter 154. Thus, the RF module 30 can signally connect to the antennae 441-448 through the switch circuitry 10. As a result, the access point 5 can radiate and receive 802.11a signals and 802.11g signals via the 802.11a/g antennae 441-444 and the 802.11g antennae 445-448. In this embodiment, a third kind of access point with the antenna selection function including the switch circuitry 10 is present.

To be noted, since the access point of the invention includes a plurality of antennae, the interference between the antennae may occur. To prevent this problem, some antennae may be embedded inside the case of the access point, while the other antennae may be detachable from the case of the access point. For example, in the access point 3 as shown in FIG. 4, the antennae 401, 403, 405, 406, 407 and 409 are detachable from the case of the access point 3, and the antennae 402, 404, 408 and 410 are embedded inside the access point 3. In the access point 4 as shown in FIG. 5, the antennae 423, 424, 425 and 427 are detachable from the case of the access point 4, and the antennae 421, 422, 426 and 428 are embedded inside the access point 4. In the access point 5 as shown in FIG. 6, the antennae 441, 443, 445 and 447 are detachable from the case of the access point 5, and the antennae 442, 444, 446 and 448 are embedded inside the access point 5.

In summary, the switch circuitry of the invention can provide the first transmission lead, the second transmission lead, the third transmission lead and the fourth transmission lead. Therefore, several wireless access points of different designs including radio and antenna configuration selections in addition to conventional antenna diversity and Transmit/Receive selections can be carried out according to variant connecting ways of the transmission leads. For example, the variant connecting ways of the transmission leads can be performed with jumpers and/or duplex filters. Accordingly, the manufacturing efficiency of the products (access points) can be enhanced.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A switch circuitry, which corresponds with a plurality of antennae, comprising a first switch module, which comprises a first control lead, a second control lead, a third control lead, a fourth control lead, a first signal lead, a second signal lead, a first antenna lead, a second antenna lead, a third antenna lead, a fourth antenna lead, a first transmission lead, a second transmission lead, a third transmission lead and a fourth transmission lead, wherein the first switch module couples the first signal lead and the second signal lead to two of the first antenna lead, the second antenna lead, the third antenna lead and the fourth antenna lead according to a plurality of control signals inputted from the first control lead, the second control lead, the third control lead and the fourth control lead;
a second switch module, which comprises a fifth control lead, a sixth control lead, a third signal lead, a fourth signal lead, a fifth antenna lead and a sixth antenna lead, wherein the second switch module couples the third signal lead and the fourth signal lead to the fifth antenna lead and the sixth antenna lead according to a plurality of control signals inputted from the fifth control lead and the sixth control lead; and
a third switch module, which comprises a seventh control lead, an eighth control lead, a ninth control lead, a tenth control lead, a fifth signal lead, a sixth signal lead, a seventh antenna lead, an eighth antenna lead, a ninth antenna lead and a tenth antenna lead, wherein the third switch module couples the fifth signal lead and the sixth signal lead to two of the seventh antenna lead, the eighth antenna lead, the ninth antenna lead and the tenth antenna lead according to a plurality of control signals inputted from the seventh control lead, the eighth control lead, the ninth control lead and the tenth control lead, and the first antenna lead, the second antenna lead, the third antenna lead, the fourth antenna lead, the fifth antenna lead, the sixth antenna lead, the seventh antenna lead, the eighth antenna lead, the ninth antenna lead and the tenth antenna lead are signally connected to the antennae.

2. The switch circuitry of claim 1, wherein:
when the first signal lead is coupled to one of the first antenna lead and the second antenna lead, the second signal lead is coupled to one of the third antenna lead and the fourth antenna lead; and
when the first signal lead is coupled to one of the third antenna lead and the fourth antenna lead, the second signal lead is coupled to one of the first antenna lead and the second antenna lead.

3. The switch circuitry of claim 1, wherein:
when the third signal lead is coupled to one of the fifth antenna lead and the sixth antenna lead, the fourth signal lead is coupled to the other one of the fifth antenna lead and the sixth antenna lead.

4. The switch circuitry of claim 1, wherein:
when the fifth signal lead is coupled to one of the seventh antenna lead and the eighth antenna lead, the sixth signal lead is coupled to one of the ninth antenna lead and the tenth antenna lead; and
when the fifth signal lead is coupled to one of the ninth antenna lead and the tenth antenna lead, the sixth signal lead is coupled to one of the seventh antenna lead and the eighth antenna lead.

5. The switch circuitry of claim 1, wherein the first switch module comprises:
a first SPDT (single pole double throw) switch, which includes the first control lead, the first transmission lead, the first antenna lead and the second antenna lead;
a second SPDT switch, which includes the second control lead, the fourth transmission lead, the third antenna lead and the fourth antenna lead; and
a first DPDT (double pole double throw) switch, which includes the third control lead, the fourth control lead, the first signal lead, the second signal lead, the second transmission lead and the third transmission lead.

6. The switch circuitry of claim 1, wherein the second switch module comprises:
a second DPDT switch, which includes the fifth control lead, the sixth control lead, the third signal lead, the fourth signal lead, the fifth antenna lead and the sixth antenna lead.

7. The switch circuitry of claim 1, wherein the third switch module comprises:
a third SPDT switch, which includes the ninth control lead, the seventh antenna lead and the eighth antenna lead;
a fourth SPDT switch, which includes the tenth control lead, the ninth antenna lead and the tenth antenna lead; and
a third DPDT switch, which includes the seven control lead, the eighth control lead, the fifth signal lead and the sixth signal lead, wherein the third SPDT switch and the fourth SPDT switch are signally connected to the third DPDT switch.

8. The switch circuitry of claim 1, further comprising:
a first jumper, which signally couples the first transmission lead and the second transmission lead; and
a second jumper, which signally couples the third transmission lead and the fourth transmission lead.

9. The switch circuitry of claim 1, further comprising:
a first filter module, wherein the fifth antenna lead and the first antenna lead are signally coupled to one of the antennae through the first filter module; and
a second filter module, wherein the sixth antenna lead and the third antenna lead are signally coupled to another one of the antennae through the second filter module.

10. The switch circuitry of claim 1, further comprising:
a third filter module, wherein the second transmission lead and the fifth antenna lead are signally coupled to the first transmission lead through the third filter module; and
a fourth filter module, wherein the third transmission lead and the sixth antenna lead are signally coupled to the fourth transmission lead through the fourth filter module.

11. The switch circuitry of claim 1, wherein the antennae comprises a plurality of 802.11a antennae and a plurality of 802.11g antennae.

12. The switch circuitry of claim 1, wherein the antennae comprises a plurality of 802.11a/g antennae and a plurality of 802.11g antennae.

13. The switch circuitry of claim 1, wherein the antennae comprises a plurality of 802.11a antennae, a plurality of 802.11a/g antennae and a plurality of 802.11g antennae.

14. An access point, comprising:
a control module, which outputs a plurality of control signals;
an RF module, which connects to the control module and outputs a plurality of RF signals and a plurality control signals;
a switch circuitry, comprising:
a first switch module, which comprises a first control lead, a second control lead, a third control lead, a fourth control lead, a first signal lead, a second signal lead, a first antenna lead, a second antenna lead, a third antenna lead, a fourth antenna lead, a first transmission lead, a second transmission lead, a third transmission lead and a fourth transmission lead,
a second switch module, which comprises a fifth control lead, a sixth control lead, a third signal lead, a fourth signal lead, a fifth antenna lead and a sixth antenna lead, and a third switch module, which comprises a seventh control lead, an eighth control lead, a ninth control lead, a tenth control lead, a fifth signal lead, a sixth signal lead, a seventh antenna lead, an eighth antenna lead, a ninth antenna lead and a tenth antenna lead; and a plurality of antennae, which are respectively signally connected to the first antenna lead, the second antenna lead, the third antenna lead, the fourth antenna lead, the fifth antenna lead, the sixth antenna lead, the seventh antenna lead, the eighth antenna lead, the ninth antenna lead and the tenth antenna lead, wherein the control signals are respectively inputted through the first control lead, the second control lead, the third control lead, the fourth control lead, the fifth control lead, the sixth control lead, the seventh control lead, the eighth control lead, the ninth control lead and the tenth control lead, the RF module connects to the first signal lead, the second signal lead, the third signal lead, the fourth signal lead, the fifth signal lead, the sixth signal lead, the third control lead, the fourth control lead, the fifth control lead, the sixth control lead, the seventh control lead and the eighth control lead, the first switch module couples the first signal lead and the second signal lead to two of the first antenna lead, the second antenna lead, the third antenna lead and the fourth antenna lead according to the control signals inputted from the first control lead, the second control lead, the third control lead and the fourth control lead, the second switch module couples the third signal lead and the fourth signal lead to the fifth antenna lead and the sixth antenna lead according to the control signals inputted from the fifth control lead and the sixth control lead, and the third switch module couples the fifth signal lead and the sixth signal lead to two of the seventh antenna lead, the eighth antenna lead, the ninth antenna lead and the tenth antenna lead according to the control signals inputted from the seventh control lead, the eighth control lead, the ninth control lead and the tenth control lead.

15. The access point of claim 14, wherein:
when the first signal lead is coupled to one of the first antenna lead and the second antenna lead, the second signal lead is coupled to one of the third antenna lead and the fourth antenna lead; and
when the first signal lead is coupled to one of the third antenna lead and the fourth antenna lead, the second signal lead is coupled to one of the first antenna lead and the second antenna lead.

16. The access point of claim 14, wherein:
when the third signal lead is coupled to one of the fifth antenna lead and the sixth antenna lead, the fourth signal lead is coupled to the other one of the fifth antenna lead and the sixth antenna lead.

17. The access point of claim 14, wherein:
when the fifth signal lead is coupled to one of the seventh antenna lead and the eighth antenna lead, the sixth signal lead is coupled to one of the ninth antenna lead and the tenth antenna lead; and
when the fifth signal lead is coupled to one of the ninth antenna lead and the tenth antenna lead, the sixth signal lead is coupled to one of the seventh antenna lead and the eighth antenna lead.

18. The access point of claim 14, wherein the first switch module comprises:

a first SPDT switch, which includes the first control lead, the first transmission lead, the first antenna lead and the second antenna lead;
a second SPDT switch, which includes the second control lead, the fourth transmission lead, the third antenna lead and the fourth antenna lead; and
a first DPDT switch, which includes the third control lead, the fourth control lead, the first signal lead, the second signal lead, the second transmission lead and the third transmission lead.

19. The access point of claim 14, wherein the second switch module comprises:
a second DPDT switch, which includes the fifth control lead, the sixth control lead, the third signal lead, the fourth signal lead, the fifth antenna lead and the sixth antenna lead.

20. The access point of claim 14, wherein the third switch module comprises:
a third SPDT switch, which includes the ninth control lead, the seventh antenna lead and the eighth antenna lead;
a fourth SPDT switch, which includes the tenth control lead, the ninth antenna lead and the tenth antenna lead; and
a third DPDT switch, which includes the seven control lead, the eighth control lead, the fifth signal lead and the sixth signal lead, wherein the third SPDT switch and the fourth SPDT switch are signally connected to the third DPDT switch.

21. The access point of claim 14, wherein the switch circuitry further comprises:
a first jumper, which signally couples the first transmission lead and the second transmission lead; and
a second jumper, which signally couples the third transmission lead and the fourth transmission lead.

22. The access point of claim 14, wherein the switch circuitry further comprises:
a first filter module, wherein the fifth antenna lead and the first antenna lead are signally coupled to one of the antennae through the first filter module; and
a second filter module, wherein the sixth antenna lead and the third antenna lead are signally coupled to another one of the antennae through the second filter module.

23. The access point of claim 14, wherein the switch circuitry further comprises:
a third filter module, wherein the second transmission lead and the fifth antenna lead are signally coupled to the first transmission lead through the third filter module; and
a fourth filter module, wherein the third transmission lead and the sixth antenna lead are signally coupled to the fourth transmission lead through the fourth filter module.

24. The access point of claim 14, wherein the antennae comprises a plurality of 802.11a antennae and a plurality of 802.11g antennae.

25. The access point of claim 14, wherein the antennae comprises a plurality of 802.11a/g antennae and a plurality of 802.11g antennae.

26. The access point of claim 14, wherein the antennae comprises a plurality of 802.11a antennae, a plurality of 802.11a/g antennae and a plurality of 802.11g antennae.

* * * * *